United States Patent
Muscha et al.

(10) Patent No.: US 8,819,472 B1
(45) Date of Patent: Aug. 26, 2014

(54) METHOD AND SYSTEM FOR CLOCK EDGE SYNCHRONIZATION OF MULTIPLE CLOCK DISTRIBUTION INTEGRATED CIRCUITS BY CONFIGURING MASTER DEVICE TO PRODUCE AT LEAST ONE GATED CLOCK OUTPUT SIGNAL

(75) Inventors: Leslie Catherine Muscha, Sunnyvale, CA (US); Doug Allen LaPorte, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 767 days.

(21) Appl. No.: 13/024,916

(22) Filed: Feb. 10, 2011

Related U.S. Application Data

(60) Provisional application No. 61/304,156, filed on Feb. 12, 2010.

(51) Int. Cl.
G06F 1/12 (2006.01)
G06F 13/42 (2006.01)
H04L 5/00 (2006.01)
H04L 7/00 (2006.01)

(52) U.S. Cl.
USPC .......................................... 713/400

(58) Field of Classification Search
USPC .......................................... 713/400
See application file for complete search history.

(56) References Cited

U.S. PATENT DOCUMENTS

| | | | |
|---|---|---|---|
| 5,793,227 A * | 8/1998 | Goldrian | 326/94 |
| 6,774,823 B1 | 8/2004 | Schafferer | |
| 7,382,844 B2 | 6/2008 | Hwang et al. | |
| 7,617,408 B2 * | 11/2009 | Frazier et al. | 713/400 |
| 7,773,606 B2 * | 8/2010 | Dobjelevski et al. | 370/395.62 |
| 2002/0118201 A1 * | 8/2002 | Mukherjee et al. | 345/504 |
| 2009/0245147 A1 * | 10/2009 | Findikli | 370/294 |
| 2012/0074994 A1 * | 3/2012 | Zhong | 327/153 |
| 2012/0155584 A1 * | 6/2012 | Wilkinson et al. | 375/354 |

* cited by examiner

*Primary Examiner* — Mohammed Rehman
(74) *Attorney, Agent, or Firm* — McDermott Will & Emery LLP

(57) ABSTRACT

Apparatus and method for clock edge synchronization among a plurality of devices. One of the plurality of devices is designated as a master device and one or more remaining devices as slave devices. The master device is configured for providing one or more gated master output clock signals based on a synchronization input signal and an input clock signal. The master device may be further configured to generate one or more gated master clock outputs to drive one or more slave devices, or to provide one or more slave synchronous master clock outputs. The one or more slave devices are configured for producing one or more slave output clock signals, based on the synchronization input signal and corresponding one or more gated master output clock signals. The one or more slave output clock signals are clock edge synchronized.

29 Claims, 12 Drawing Sheets

US 8,819,472 B1

METHOD AND SYSTEM FOR CLOCK EDGE SYNCHRONIZATION OF MULTIPLE CLOCK DISTRIBUTION INTEGRATED CIRCUITS BY CONFIGURING MASTER DEVICE TO PRODUCE AT LEAST ONE GATED CLOCK OUTPUT SIGNAL

RELATED APPLICATION

The present invention claims priority of provisional patent application No. 61/304,156 filed Feb. 12, 2010, the contents of which are incorporated herein in their entirety.

BACKGROUND

1. Technical Field

The present teaching relates to method and system for analog circuits. More specifically, the present teaching relates to method and system for clock edge synchronization and systems incorporating the same.

2. Discussion of Technical Background

With the improved performance of CMOS processes over the past decade, digital circuitry is increasingly prevalent in modern electronics. Most electrical systems rely on clocks for different tasks such as conversion of analog signals to digital data, accessing and processing digital data, and converting digital data back to analog signals. Because of increasing circuit complexity and higher operating frequencies, stringent requirements are placed on the precision of clock signals in such systems to insure both accurate data conversion and proper data access and transmission.

Requirements on clocks used to access and process digital data differ from requirements on clocks used for data conversion. Synchronization of clocks for the former situation is referred to as "data window synchronization" and clock synchronization for the latter situation is termed "clock edge synchronization" in the present teaching. In data window synchronization, where the data is already in digital format, insuring adequate set-up/hold times across multiple flip-flops to ensure simultaneous access of this data often dominates the design challenges. An example of data window synchronization is described in U.S. Pat. No. 6,774,823, entitled "Clock Synchronization Logic," assigned to Analog Devices, Incorporated. At the chip level, where propagation delays can often be kept to less than the clock period, careful design of the clock tree and digital data path delays can achieve data window synchronization. However, with ever increasing circuit size and, hence increasing propagation delays, careful design may no longer be sufficient. At the system level, where data may be transmitted over optical networks, other techniques must be employed to insure data integrity.

Clocks used to sample the analog inputs of multiple analog-to-digital converters (ADC's) may require sampling edges that are precisely synchronized so that all ADC inputs are sampled simultaneously. In this case, the absolute time at which the sampling operation takes place is often not critical. What is essential is the timing of the first and all subsequent clock edges used for sampling are precisely synchronized. That is, to achieve simultaneous sampling at all ADC inputs, the first and all subsequent clock edges must be time aligned, or clock edge synchronized. In the following disclosure, unless specifically noted, further references to clock synchronization refer to clock edge synchronization.

Just as careful clock tree and data path design usually allows data window synchronization at the chip level, the same is also true for achieving clock edge synchronization of a single clock distribution chip. A conventional circuit 100 that allows, at the chip level, clock edge synchronization of multiple clocks is shown in FIG. 1 (Prior Art). The circuit 100 takes a synchronization pulse SYNC (105) and a clock signal CLKI (110) as inputs and produces two synchronized output clock signals, CLKO_A (170) and CLKO_B (180). Circuit 100 includes serially connected flip-flops, FF1 (120), FF2 (130) and FF3 (140), as well as two clock distribution blocks 150 and 160, which generate output clock signals CLKO_A (170) and CLKO_B (180), respectively.

In operation, when the synchronization pulse SYNC (105) asserts, CLKO_A (170) and CLKO_B (180) are both forced to a known state. After SYNC (105) de-asserts, both clocks resume transitioning, but with their rising edges synchronized. This is illustrated in the timing diagram shown in FIG. 2 (Prior Art), in which signal 200 represents the clock signal 110, signal 210 represents the synchronization pulse 105, signal 220 represents the output signal from the last flip-flop 140, and signals 230 and 240 represent the synchronized clock outputs CLKO_A (170) and CLKO_B (180), respectively. Because the SYNC pulse (105) is asynchronous with respect to CLKI (110), flip-flops FF1-FF3 (120, 130 and 140) are included to retime SYNC (105) with respect to CLKI (110) to avoid metastability. As shown in FIG. 2, the retimed output of the three flip-flops, SYNC_INT (220), forces both CLKO_A (230) and CLKO_B (240) low when SYNC_INT (220) transitions high. When SYNC_INT (220) transitions low, output clock signals CLKO_A (230) and CLKO_B (240) resume clocking with edges aligned.

For this prior art approach to work, matching the delays of the parallel connections of the CLKI (110) and SYNC_INT inputs to the two CLKDIST blocks (150 and 160) is critical. In addition, insuring appropriate set-up/hold time margins within the CLKDIST blocks (150 and 160) is required, so that CLKO_A (170) and CLKO_B (180) can both resume clocking synchronously.

If an application requires more than two synchronized clock outputs, a prior art solution connects multiple chips, constructed the same way as circuit 100, in parallel. For example, in an application requiring four synchronized clock outputs, FIG. 3 (Prior Art) shows an implementation where two chips, CHIPA (310) and CHIPB (350), connect in parallel with respect to input signals SYNC (300) and CLKI (305). CHIPA (310) includes three serially connected flip-flops, FF1 (315), FF2 (320), and FF3 (325), which retime input signal SYNC (300) with respect to CLKI (305). The retimed output of the three flip-flops, SYNC_INT_A, is then fed to two clock distribution blocks, 330 and 335, which generate output clock signals CLKO_AA (340) and CLKO_BA (345) of CHIPA (310), respectively.

Similarly, CHIPB (350) includes three serially connected flip-flops, FF1 (355), FF2 (360), and FF3 (365), which also retime input signal SYNC (300) with respect to CLKI (305). The retimed output of the three flip-flops, SYNC_INT_B, is then fed to two clock distribution blocks, 370 and 375, which generate output clock signals CLKO_AB (380) and CLKO_BB (385) of CHIPB (350), respectively. Although a straightforward arrangement, the implementation shown in FIG. 3 may not produce four clock edge synchronized outputs. For instance, even though the clock outputs CLKO_AA (340) and CLKO_BA (345) of CHIPA (310) are synchronized, they may not be clock edge synchronized with the clock outputs CLKO_AB (380) and CLKO_BB (385) of CHIPB (350).

The timing diagram shown in FIG. 4 (Prior Art) helps clarify the operation of the circuit in FIG. 3. In FIG. 4, signal 410 represents the clock input 305 and signal 420 represents the synchronization input pulse 300. Furthermore, signal 430 represents an internal signal in CHIPA, the output of flip-flop 325, and similarly, signal 460 represents an internal signal in CHIPB, the output of flip-flop 365. In addition, signals 440 and 450 represent the synchronized clock outputs of CHIPA, CLKO_AA (340) and CLKO_BA (345), respectively. Similarly, signals 470 and 480 represent the synchronized clock outputs of CHIPB, CLKO_AB (380) and CLKO_BB (385), respectively.

FIG. 4 illustrates the problem of using the implementation in FIG. 3 to achieve clock edge synchronization of four outputs. Specifically, the internal synchronization signal for CHIPA, SYNC_INT_A (430), transitions one CLKI (410) cycle earlier than the similar signal for CHIPB, SYNC_INT_B (460). As a result, the output clock signals controlled by SYNC_INT_A (430), CLKO_AA (440) and CLKO_BA (450), are not clock edge synchronized with those controlled by SYNC_INT_B (460), CLKO_AB (470) and CLKO_BB (480). The one cycle difference in transition time between SYNC_INT_A (430) and SYNC_INT_B (460) may have several causes. One possibility is trace length mismatches of the SYNC (300) input lines to CHIPA (310) and CHIPB (350) on the printed circuit board (PCB). A mismatch where the SYNC (300) line to CHIPB (350) is slightly longer than the line to CHIPA (310) would cause the SYNC (300) input to arrive at CHIPB (350) slightly later than it arrives at CHIPA (310), and therefore SYNC_INT_B (460) would transition one cycle later than SYNC_INT_A (430). When the challenge of precisely matching PCB trace lengths is coupled with the fact that the SYNC signal (420) is asynchronous with respect to CLKI (410), it becomes virtually impossible to ensure that the SYNC (420) pulse will be latched on the same clock edge by both CHIPA (310) and CHIPB (350), unless an additional sub-circuit is added.

FIG. 5 (Prior Art) shows another prior art circuit in which a retiming circuit 507 has been added to the circuit in FIG. 3. In FIG. 5, circuits in CHIPA (510) and CHIPB (550) are constructed similarly to those in FIG. 3. Circuit 507 retimes the SYNC pulse (500) with respect to the clock input, CLKI (505), and produces the synchronization inputs to both CHIPA (510) and CHIPB (550). The addition of circuit 507 insures that SYNCA (508) and SYNCB (509) are synchronous with respect to CLKI (505). Therefore, the addition of circuit 507 solves the problem of the synchronization inputs to CHIPA (510) and CHIPB (550) being asynchronous with respect to CLKI (505); however, extreme care still must be taken to match the traces going to CHIPA (510) and CHIPB (550). For example, the traces SYNCA (508) and SYNCB (509), which go from the output of circuit 507 to the inputs of CHIPA (510) and CHIPB (550), respectively, need to be nearly identical lengths so flip-flops 515 and 555 will latch the synchronization input on the same cycle. In addition, matching the lengths of the CLKI signals (505) to both CHIPA (510) and CHIPB (550) is equally critical.

U.S. Pat. No. 7,382,844, entitled "Methods to Self-Synchronize Clocks on Multiple Chips in a System," discloses another prior art solution for clock edge synchronization of multiple integrated circuits. This is shown in FIG. 6 (Prior Art). In circuit 600, one chip, Chip A (610), is designated as the master chip and the others as slave chip(s). The master chip stores a calibration macro 620, which enables a calibration sequence to measure the roundtrip delay between the master and each slave chip.

From the delay measurement(s) acquired during the calibration, the master chip determines an appropriate delay, denoted as D (630) in FIG. 6, for each "slave" chip. Through such calibration, a delay is programmed on the master chip with respect to each slave chip so that future synchronization pulses sent to a slave chip are appropriately delayed to ensure that the "time zero" clock edge of all chips is synchronized. That is, for every slave device, the master chip must determine and store a delay. Thus, the master chip requires a circuit to measure the roundtrip delay, a variable delay element, and a bidirectional tri-state driver. In addition, the master also needs to include digital circuitry to perform the calibration sequence. Furthermore, each slave chip must have circuitry to participate in the calibration sequence and communicate with the master chip in order for the master to measure the delay. Therefore, this prior art approach requires significant additional circuitry to both the master and the slave chips.

SUMMARY

In accord with one aspect, provided is a master device for clock edge synchronization among the master device and one or more slave devices which configured for producing one or more slave output clock signals based on a synchronization input signal and at least one gated master output clock signal. The master device is configured for providing one or more gated master output clock signals based on the synchronization input signal and an input clock signal, and comprises one or more clock distribution circuits, each of which generates a corresponding gated master output clock signal.

Each gated master output clock signal is configured either for driving the one or more slave devices or to be a master output clock signal that is clock edge synchronized with the slave output clock signals.

In accord with another aspect, an apparatus for clock edge synchronization among a plurality of devices, comprises a master device configured for providing one or more gated master output clock signals based on a synchronization input signal and an input clock signal; and one or more slave devices configured for producing one or more slave output clock signals based on the synchronization input signal and corresponding one or more gated master output clock signals, wherein the one or more slave devices' output clock signals are clock edge synchronized.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Apparatus and method for clock edge synchronization across multiple integrated circuit chips. The present teaching presents a deterministic approach and implementation thereof to achieve clock edge synchronization across multiple clock distribution integrated circuits without measuring roundtrip delays or requiring a precisely timed synchronization input to all chips.

Generally, the present teaching relates to a system with multiple chips, one of which is designated as a master chip and the others as slave chips. The master chip produces multiple output clocks based on an input clock. In some embodiments, some of the output clocks from the master chip can be designated to drive a slave chip and some can be designated as slave synchronous output clocks. In some embodiments, each of the output clocks from the master chip has the flexibility to be independently configured to drive a slave chip or to provide a slave synchronous output clock. In addition, some embodiments allow each of the output clocks from the master chip to be independently configured to operate at a frequency equal to the input clock frequency or at a frequency reduced by a factor of a programmed divide modulus.

In accordance with the present teaching, the master chip controls the output clocks of all slave chips by providing gated clock inputs to all slave chips. Clock edge synchronization is achieved because the master chip controls when all other chips latch in their synchronization inputs, and hence when their clock outputs will resume transitioning.

Figure 1:
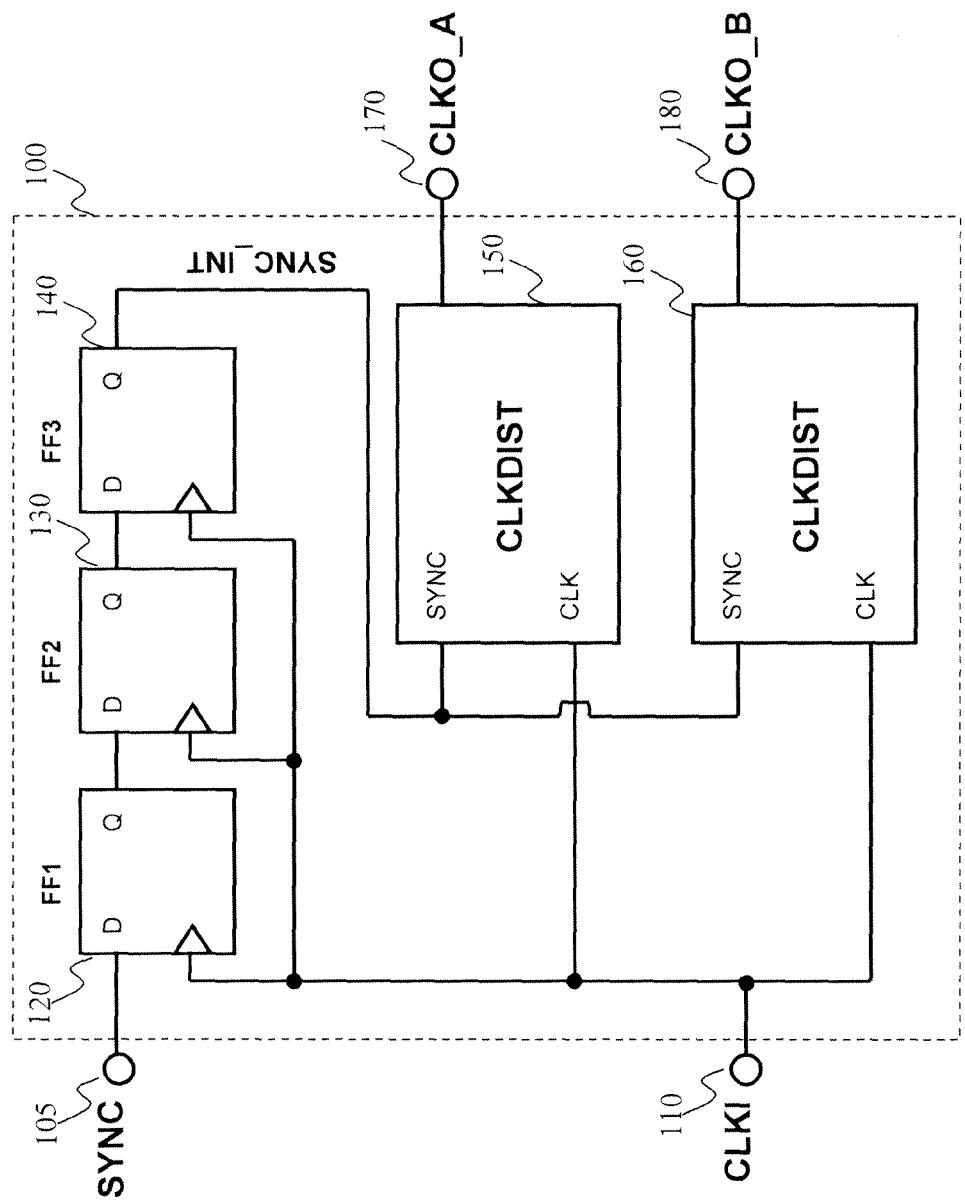
FIG. 1 (Prior Art) shows a clock edge synchronization circuit.
Figure 2:
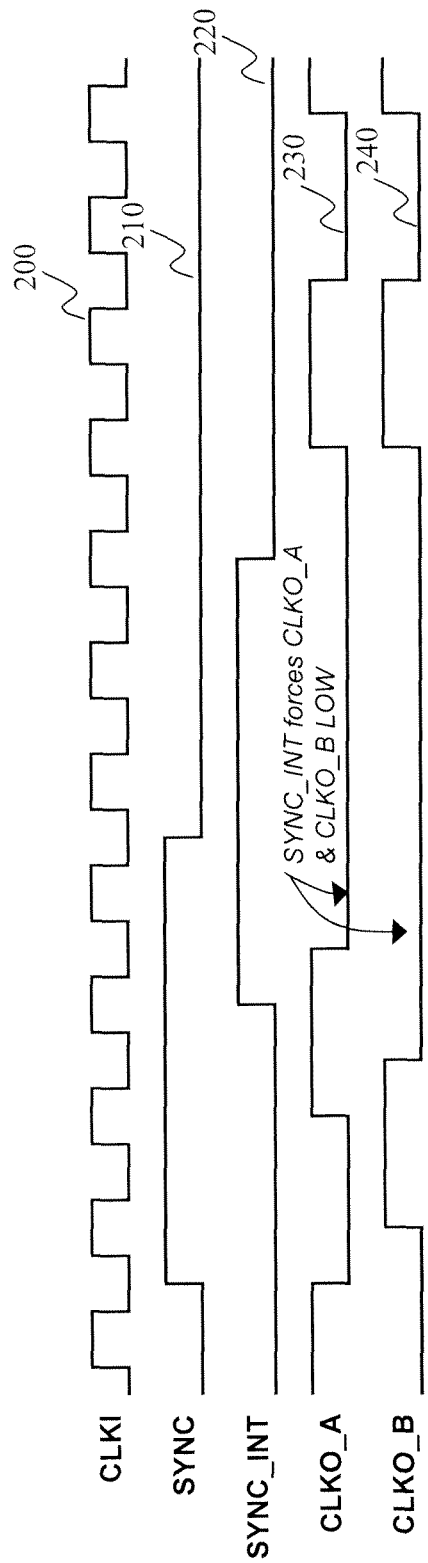
FIG. 2 (Prior Art) shows timing diagrams of different signals produced by the prior art clock edge synchronization circuit shown in FIG. 1.
Figure 3:
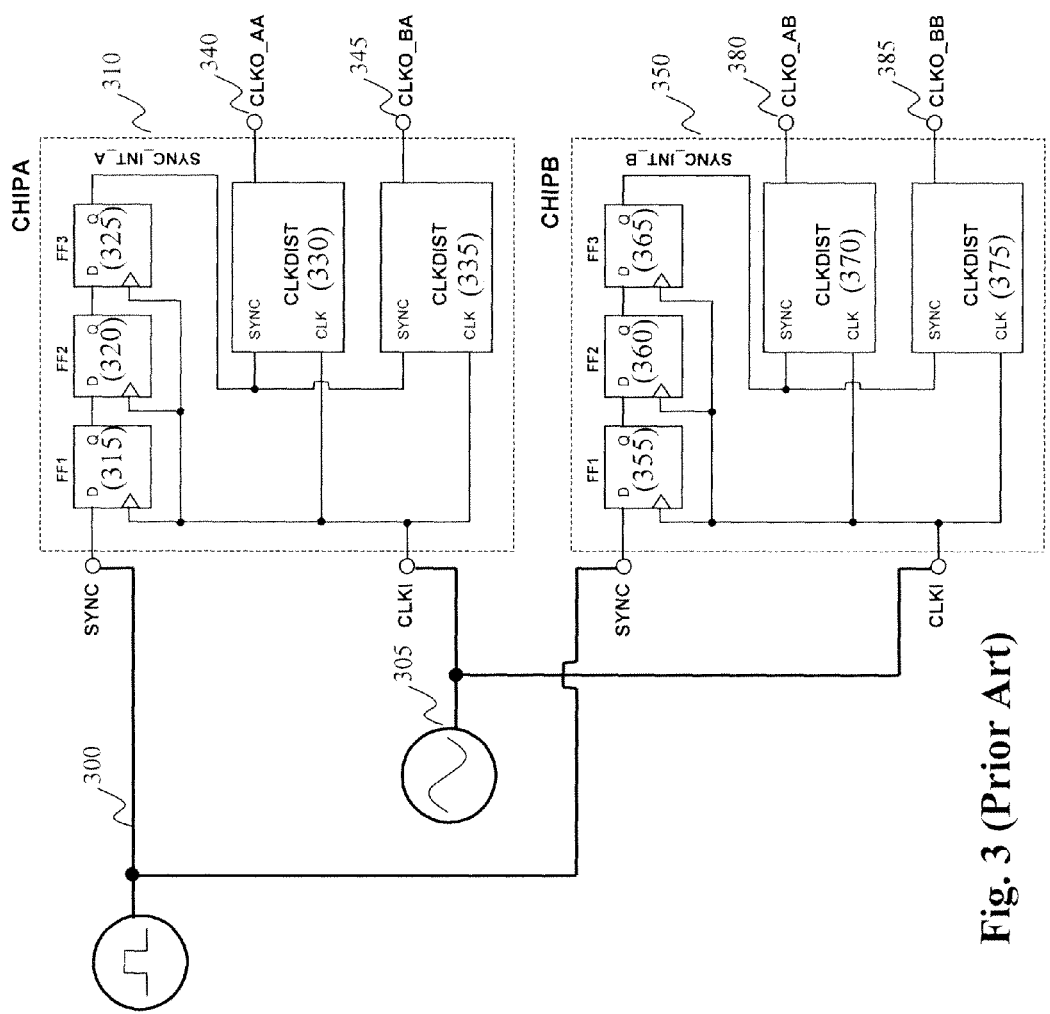
FIG. 3 (Prior Art) shows a different clock edge synchronization circuit across multiple chips.
Figure 4:
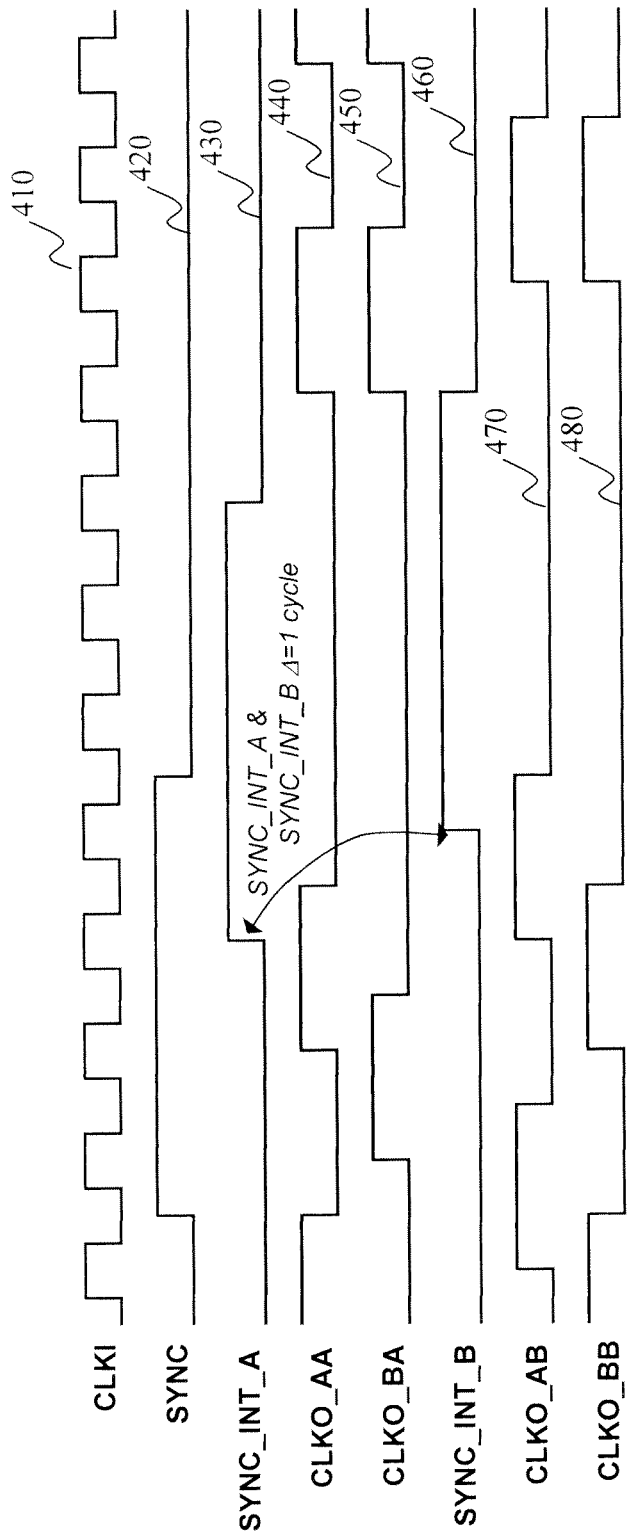
FIG. 4 (Prior Art) shows timing diagrams of different signals produced by the prior art clock edge synchronization circuit shown in FIG. 3.
Figure 5:
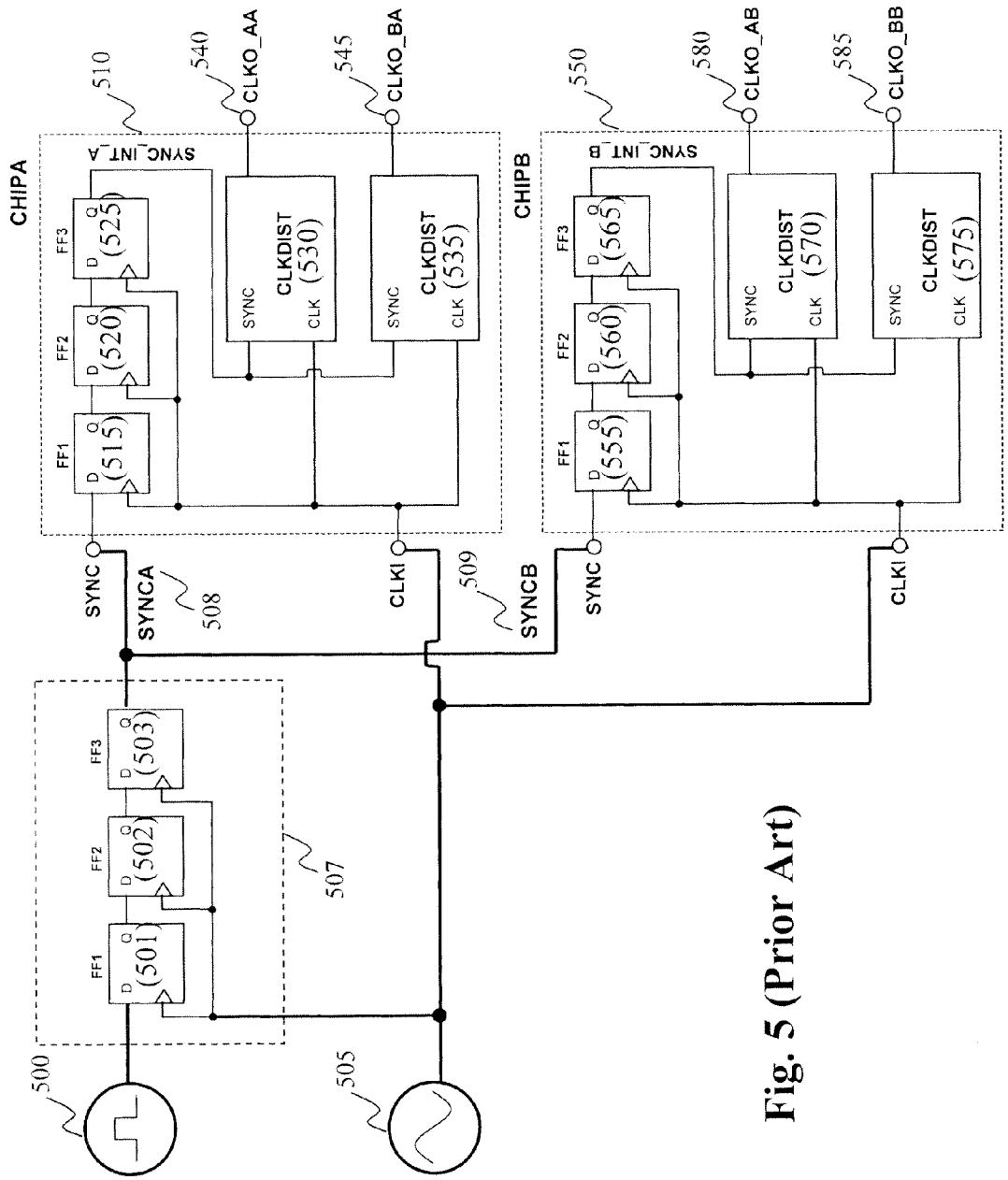
FIG. 5 (Prior Art) shows yet another clock edge synchronization circuit across multiple chips with a sub-circuit for retiming a synchronization input signal with respect to the input clock.
Figure 6:
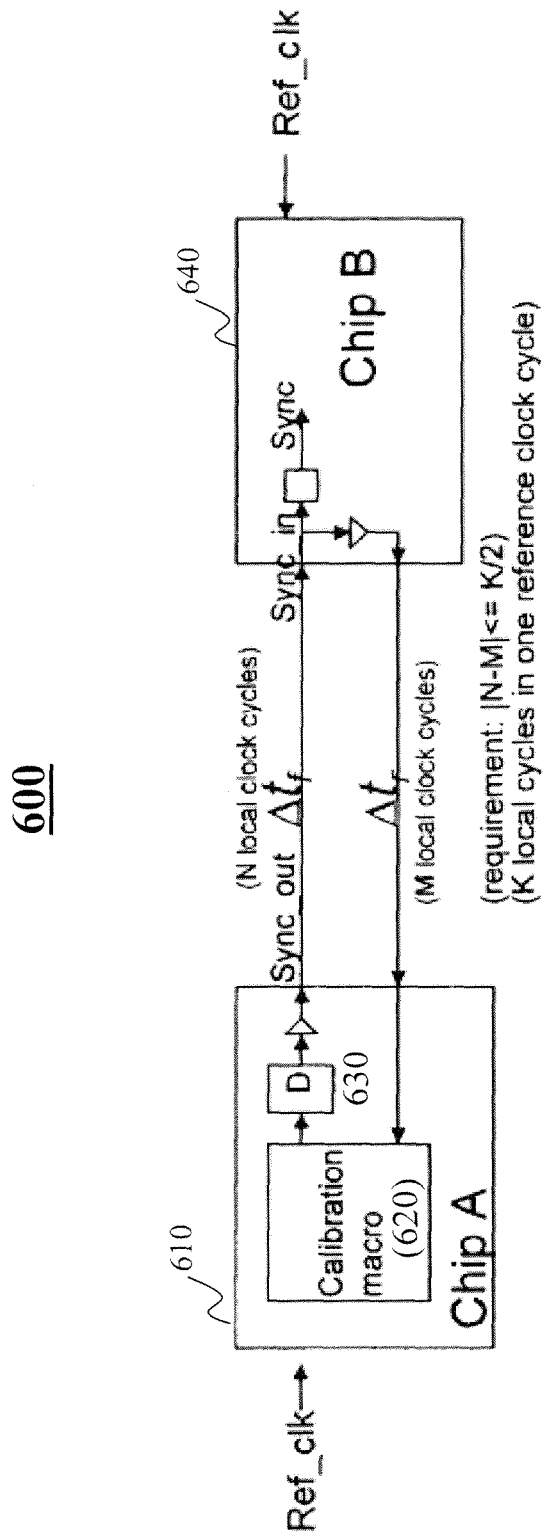
FIG. 6 (Prior Art) shows a clock edge synchronization circuit with designated master and slave chips and a mechanism of measuring delays between the master and slave chips.
Figure 7:
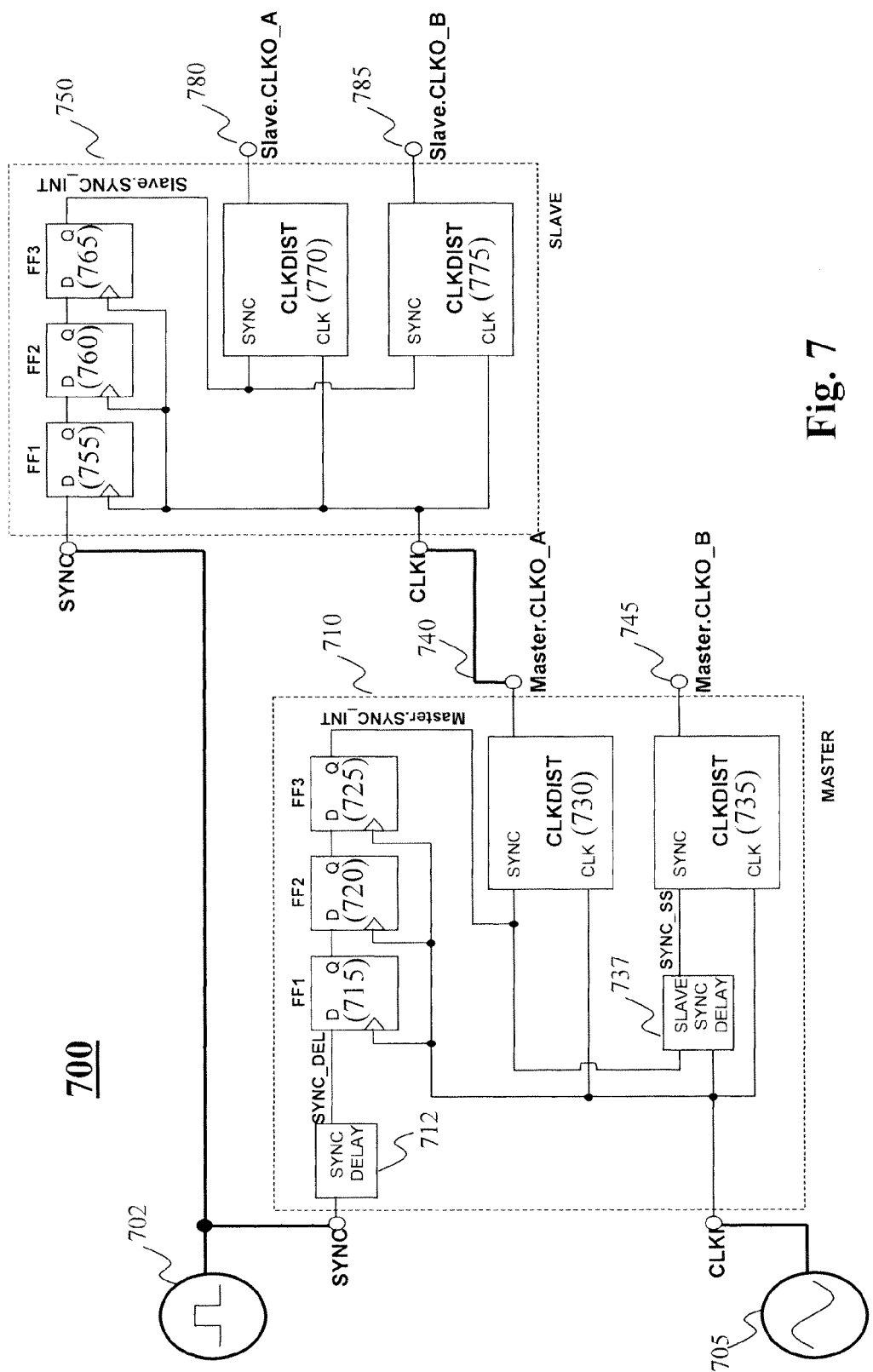
FIG. 7 depicts a circuit for clock edge synchronization across multiple chips, according to an embodiment of the present teaching.

FIG. 7 depicts an exemplary circuit 700 for clock edge synchronization across multiple integrated circuit chips, according to an embodiment of the present teaching. Circuit 700 shows two exemplary clock distribution integrated circuit chips: one is master chip 710 and the other is slave chip 750. The slave chip 750 is constructed the same way as circuit 100 shown in FIG. 1. The master chip 710 has the same components as circuit 100, such as three serially connected flip-flops (715, 720 and 725) and two clock distribution blocks (730 and 735). However, the master chip 710 includes two additional sub-circuits: a SYNC DELAY sub-circuit (712) and a SLAVE SYNC DELAY sub-circuit (737). Sub-circuit 712 takes signal SYNC (702) as an input and produces a delayed synchronization signal SYNC_DEL. SYNC_DEL is then retimed by three serially connected flip-flops to produce an internal synchronization signal, Master.SYNC_INT, which is synchronous with the input clock signal CLKI (705). Master.SYNC_INT is sent to the first clock distribution block 730 as an input. It is also sent to the second sub-circuit, SLAVE SYNC DELAY (737), to produce a signal SYNC_SS, which is an input to the second clock distribution block 735. Details related to these two additional sub-circuits will be provided below.

The present teaching allows clock edge synchronization of multiple chips by designating one chip as the master and having all clocking controlled by this master chip. As shown in FIG. 7, clock signal CLKI (705) is an input to only the master chip 710. The master chip takes SYNC (702) and CLKI (705) as inputs and generates two gated output clock signals, Master.CLKO_A (740) and Master.CLKO_B (745). One of the output clocks, Master.CLKO_A (740), is sent as a clock input to the slave chip 750. The other output clock, Master.CLKO_B (745), is synchronized with the output clocks of the slave chip, the implementation of which is discussed in detail below.

In operation, a slave chip, e.g., 750, latches in the SYNC pulse (702) based on its input clock signal, e.g., Master.CLKO_A (740), which is generated by the master. Since the master chip has already latched in the SYNC pulse (702), it can generate gated clock signals Master.CLKO_A (740) and Master.CLKO_B (745), each delayed by an appropriate number of CLKI (705) cycles such that Master.CLKO_B (745) will be clock edge synchronized with the output clock signals produced by the slave. In this way, there are no requirements to measure roundtrip delay or to precisely layout the SYNC traces to obtain clock edge synchronization.

Figure 8:
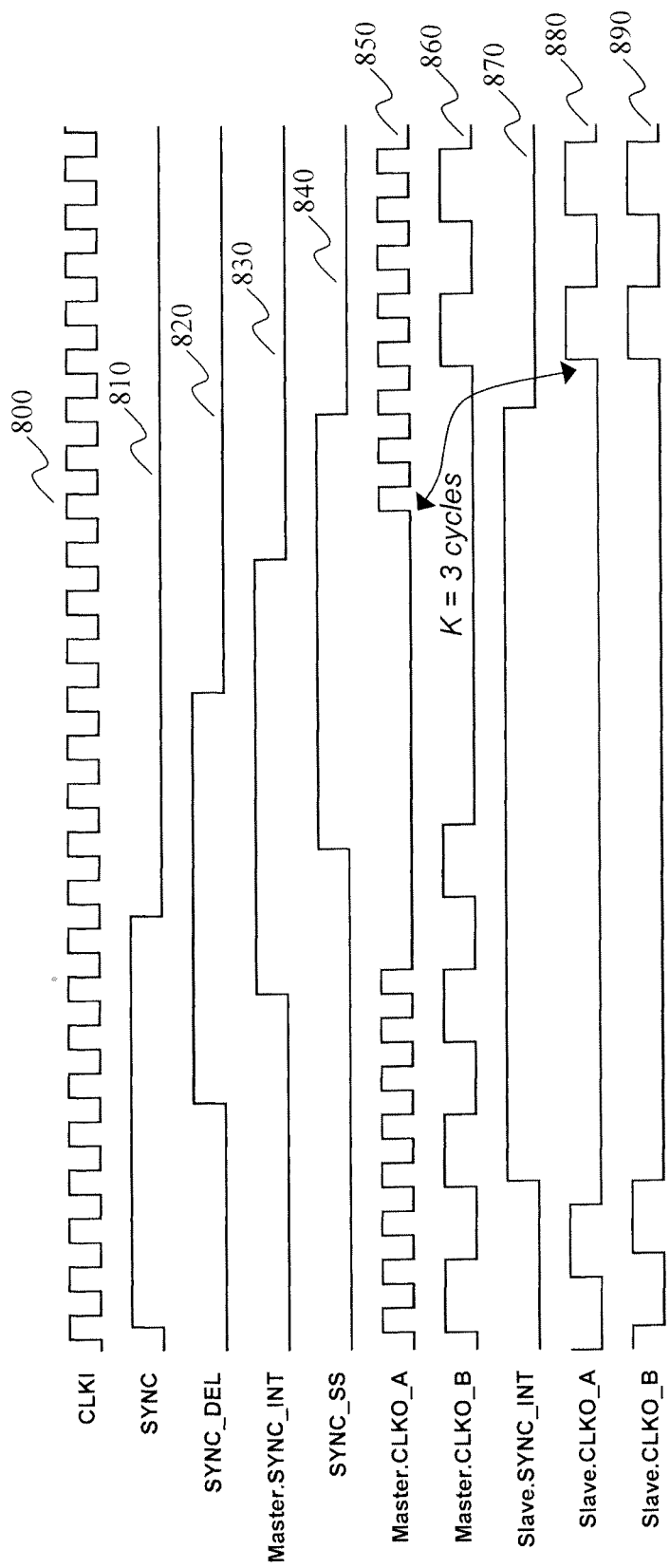
FIGS. 8-10 show timing diagrams of different signals produced by the circuit as depicted in FIG. 7.

The timing diagram shown in FIG. 8 demonstrates the operation of circuit 700. In FIG. 8, signal 800 represents the clock input 705, and signal 810 represents the synchronization input pulse 702. In addition, signal 820 represents the output of sub-circuit 712, signal 830 represents the output of flip-flop 725, and signal 840 represents the output of sub-circuit 737, all of which are internal synchronization signals present in the master chip 710. Similarly, signal 870 represents the output of flip-flop 765, an internal synchronization signal present on slave chip 750. Furthermore, signals 850 and 860 represent the gated output clocks (740 and 745, respectively) of the master chip 710, and signals 880 and 890 represent the output clocks (780 and 785, respectively) of the slave chip 750.

As illustrated in FIG. 8, the SYNC DELAY block (712) delays the SYNC input (810) to the master chip and produces the signal SYNC_DEL (820). Three serially connected flip-flops, FF1-FF3 (715, 720 and 725), retime SYNC_DEL (820) with respect to master clock input, CLKI (800), and produce an internal synchronization signal, Master.SYNC_INT (830). Because of the subsequent retiming flip-flops, the SYNC DELAY sub-circuit (712) need not provide a delay that is synchronized with respect to the input clock signal CLKI (705). The retimed signal, Master.SYNC_INT (830), is then used by clock distribution block 730 to produce the gated clock output, Master.CLKO_A (850). As can be seen in FIG. 8, the gated clock output, Master.CLKO_A (850), stops transitioning when Master.SYNC_INT (830) goes high. When Master.SYNC_INT (830) goes low again, Master.CLKO_A (850) resumes transitioning on the first rising edge of signal CLKI (800).

The purpose of the SYNC DELAY sub-circuit (712) is twofold. First, it ensures that the slave chip 750 will latch in the high value of the SYNC input (810) before its gated clock input, Master.CLKO_A (850), stops transitioning. Second, the SYNC DELAY sub-circuit (712) ensures the SYNC input (810) has gone low before Master.CLKO_A (850) resumes transitioning, so that the slave chip 750 is ready to respond as soon as its gated clock input begins transitioning again. To ensure both these criteria are met, sub-circuit SYNC DELAY (712) needs to provide a delay longer than the cumulative PCB, cable, and connector delays that may cause the SYNC pulse (702) to arrive at the slave chip 750 later than at the master chip 710. This cumulative delay can be defined as the maximum expected delta delay between the master chip 710 and the slave chip 750, and it must be accounted for in the SYNC DELAY sub-circuit (712) to ensure the slave chip 750 responds properly to its gated clock input.

The exemplary timing diagram in FIG. 8 shows that the slave chip 750 has several clock cycles to latch in its SYNC input (810) before Master.CLKO_A (850) stops transitioning. Similarly, the SYNC input (810) connected to the slave chip 750 has gone low several cycles before Master.CLKO_A (850) begins transitioning again. In this way, the gated clock output, Master.CLKO_A (850), produced by the master chip 710 controls when the slave chip 750 outputs (880 and 890) resume transitioning after a SYNC pulse, not the SYNC pulse itself.

In the exemplary embodiment shown in FIGS. 7 and 8, the SYNC input (810) requires three rising edges of Master.CLKO_A (850) to propagate through slave chip 750 to produce Slave.SYNC_INT (870), because of the three metastability prevention flip-flops (755, 760, and 765). The outputs of slave chip 750, Slave.CLKO_A (880) and Slave.CLKO_B (890), begin transitioning on the first rising edge of Master.CLKO_A (740) following Slave.SYNC_INT transitioning low.

Although illustrated using three cycles, the number of Master.CLKO_A (850) cycles needed before the outputs of the slave chip 750 begin to transition can be an arbitrary number, say K, as illustrated in FIG. 8. The parameter K represents the number of input clock cycles of propagation delay for a specific slave chip, and typically corresponds to the number of flip-flops in the slave chip's output clock signal path. The value of K needs to be taken into account by the master chip in order to synchronize the other output clock signal, Master.CLKO_B (860), with the output clock signals of the slave chip. That is, by taking into account the value of K for slave chip 750, the output Master.CLKO_B (860) can be made slave synchronous, or clock edge synchronized, with the outputs of the slave chip 750.

To make the master chip's outputs slave synchronous, master chip 710 employs the sub-circuit SLAVE SYNC DELAY (737) to delay signal Master.SYNC_INT (830) by a certain number of CLKI clock cycles, based on the value of K for the slave chip. The output of SLAVE SYNC DELAY (737), SYNC_SS (840), provides the SYNC input to the clock distribution block 735. As can be seen in FIG. 8, the gated clock output, Master.CLKO_B (860), stops transitioning when SYNC_SS (840) goes high. When SYNC_SS (840) goes low again, Master.CLKO_B (860) resumes transitioning on the first rising edge of signal CLKI (800). In this way, the parameter K, associated with the number of clock cycles of propagation delay inherent to the slave chip 750, is fed back or programmed into the SLAVE SYNC DELAY sub-circuit (737) of the master chip, to make Master.CLKO_B (860) slave synchronous.

Figure 9:
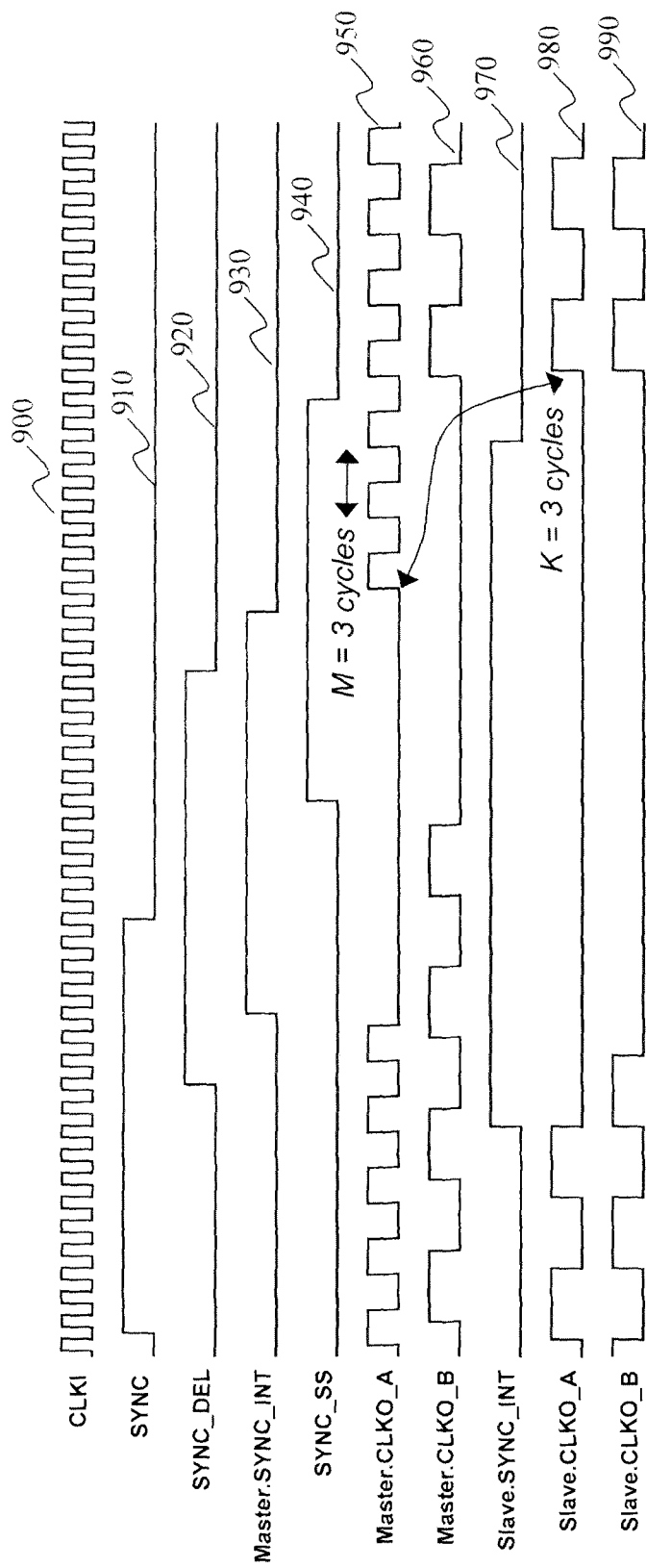

In some situations, the frequency of Master.CLKO_A (740) is lower than that of the input clock signal, CLKI (705), due to frequency division sub-circuitry contained within the clock distribution block 730. For example, in the exemplary timing diagram shown in FIG. 9, the frequency of Master.CLKO_A (950) is one-third that of CLKI (900). This introduces another complication because the SYNC input (910) will take three times longer to propagate through slave chip 750, than it will in the example shown in FIG. 8, because the period of the clock input to the slave chip is three times that of CLKI. In this case, the number of CLKI cycles delay required from sub-circuitry SLAVE SYNC DELAY (737) to produce a slave synchronous output can be determined by the following general formula:

SLAVE SYNC DELAY=$K \times M$ where:
K is the number of input clock cycles of propagation delay for a specific slave chip (K=3 in FIG. 8 and FIG. 9, due to FF1-FF3)
M is the divide modulus, with respect to CLKI, of the gated master output clock used to drive the slave chip (M=1 in FIG. 8 and M=3 in FIG. 9)

For the example shown in FIG. 8, the SLAVE SYNC DELAY has a value of 3 CLKI cycles, because K=3 and M=1. For the example shown in FIG. 9, the SLAVE SYNC DELAY has a value of 9 CLKI cycles, because K=3 and M=3.

Note that for each different divide modulus, M, the master chip must adjust the number of CLKI cycles delay provided by the SLAVE SYNC DELAY sub-circuitry. Based on known K and M values, the appropriate value can either be computed or identified via a look-up table on the master chip.

Figure 10:
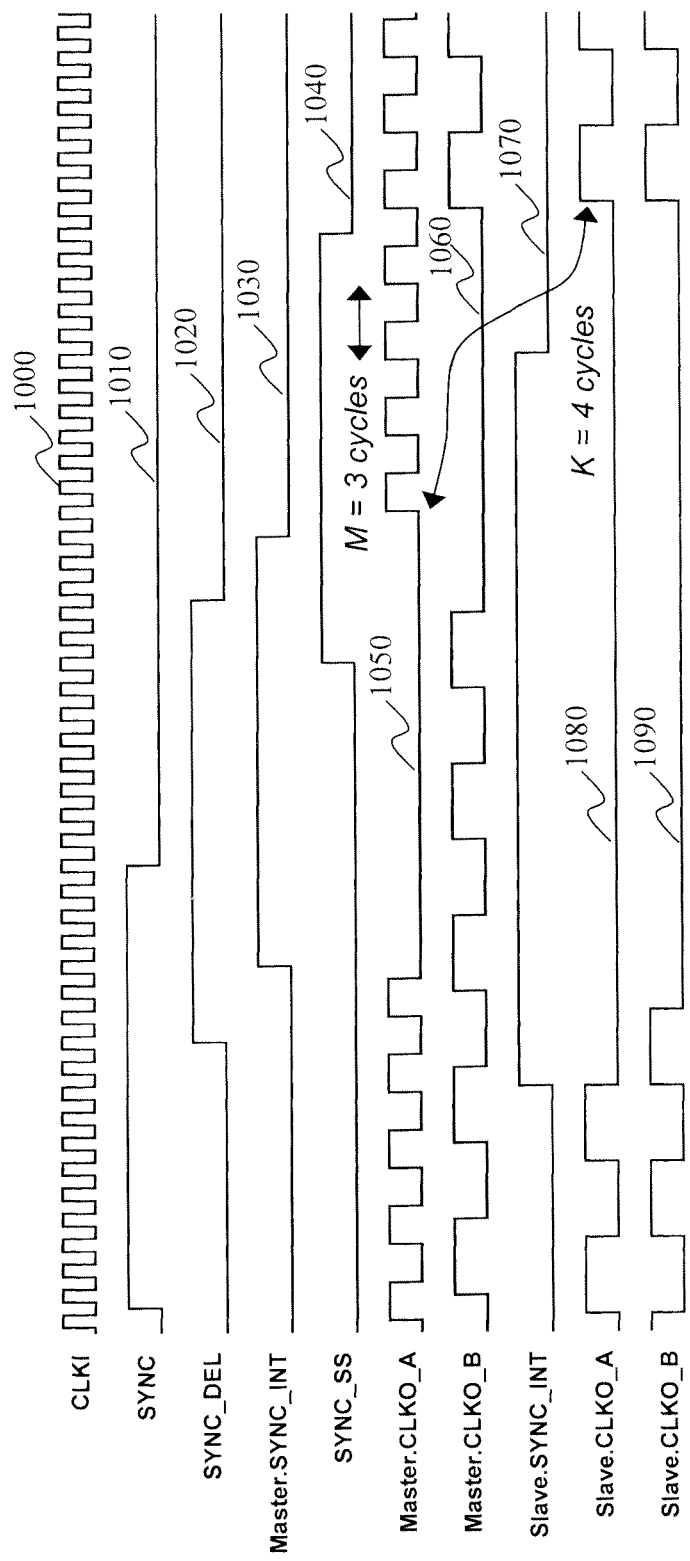

The exemplary timing diagram shown in FIG. 10 demonstrates the effect of the slave chip 750 having an additional cycle delay, in addition to the three cycles caused by the metastability prevention flip-flops (755, 760 and 765). The additional clock cycle delay could be the result of another retiming flip-flop or possibly a more complicated clock gating function inside the clock distribution blocks (770 and 775). In FIG. 10, K=4 and M=3, so the required SLAVE SYNC DELAY must be 12, to achieve slave synchronous behavior for Master.CLKO_B (1060). Note that it is also possible that the parameter K could be greater than 4, possibly due to the addition of multiple retiming flip-flops. In general, K must represent the total number of clock cycles of delay in the slave chip's output signal path.

Figure 11:
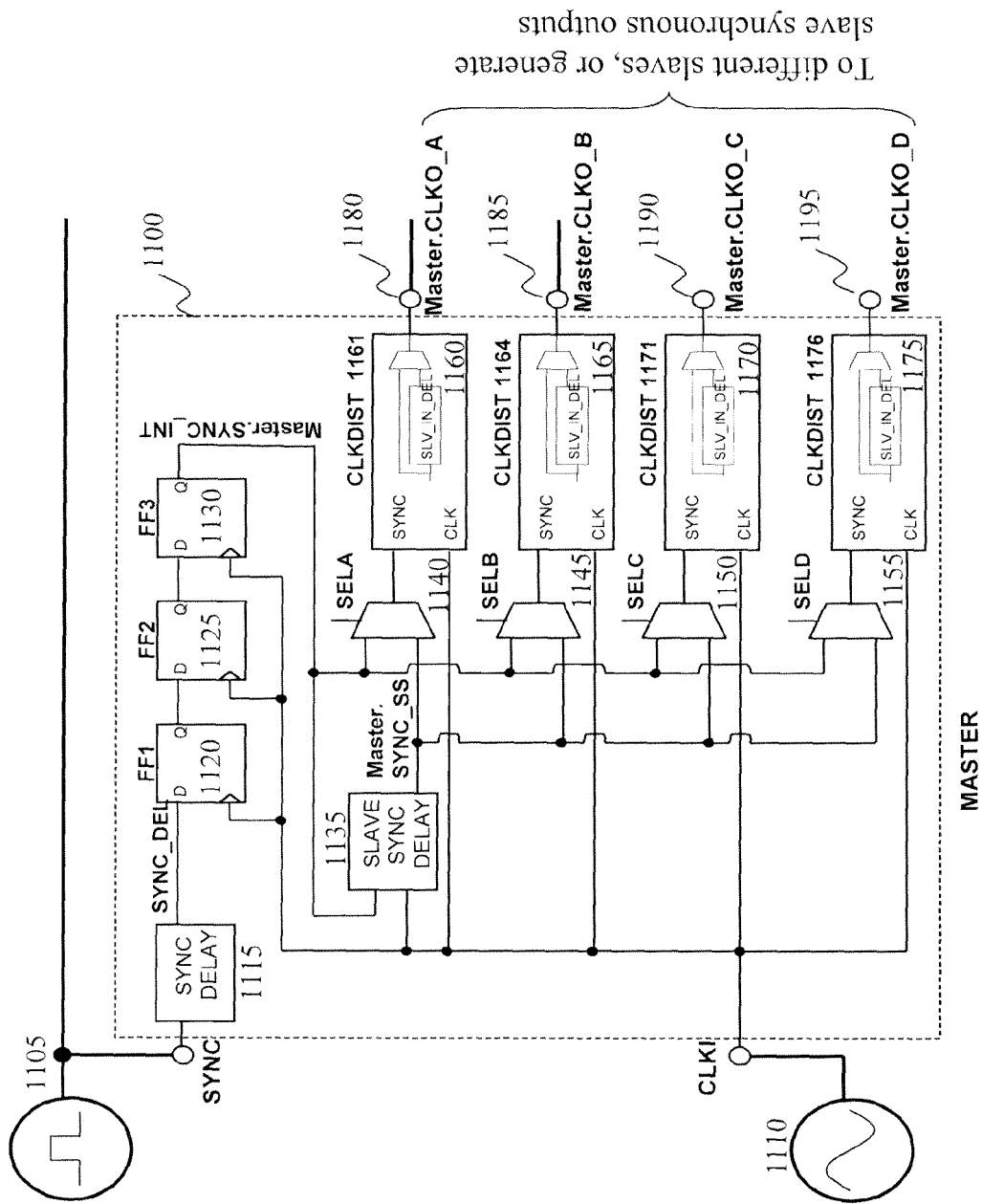
FIG. 11 depicts another circuit for clock edge synchronization across multiple chips, according to an embodiment of the present teaching.

In FIG. 7, master chip 710 produces one output clock, Master.CLKO_A (740), which is used to drive a slave chip 750. The master chip 710 also generates another clock output, Master.CLKO_B (745), that is slave synchronous. The present teaching also allows situations in which a master chip produces multiple gated output clock signals to drive multiple slave chips. FIG. 11 depicts an exemplary circuit 1100 of a master chip constructed for that purpose, in accordance with an embodiment of the present teaching.

In FIG. 11, a master chip 1100 takes the SYNC signal (1105) and the CLKI signal (1110) as inputs and produces four outputs Master.CLKO_A (1180), Master.CLKO_B (1185), Master.CLKO_C (1190), and Master.CLKO_D (1195). In some embodiments, each of the master clock outputs may be either used to drive a slave chip or configured as a slave synchronous clock output. To reduce circuitry, other embodiments may designate some of the master clock outputs drive slave chips, while the others are always slave synchronous. Further circuit simplifications to the master chip are possible by having multiple outputs share the same CLKDIST block (1161, 1164, 1171 and 1176).

The circuit 1100 shown in FIG. 11 allows any master output clock signal to either drive a slave chip or provide a slave synchronous output. Circuit 1100 shares many components with circuit 700 shown in FIG. 7, including a sync delay circuit 1115, three retiming flip-flops (1120, 1125, and 1130), a SLAVE SYNC DELAY circuit 1135, and a number of clock distribution blocks 1161, 1164, 1171, and 1176. Each of the CLKDIST blocks produces an output clock signal, Master.CLKO_A (1180), Master.CLKO_B (1185), Master.CLKO_C (1190), and Master.CLKO_D (1195), respectively.

A two-input multiplexer is added in front of each clock distribution block in circuit 1100 to allow any output signal from the master chip to either drive a slave chip or provide a slave synchronous output clock. For example, the control input to multiplexer 1140, SELA, selects either Master.SYNC_INT or Master.SYNC_SS to drive the SYNC input of the clock distribution block 1161. When the output signal of clock distribution block 1161, Master.CLKO_A, drives a slave chip, SELA should be configured so Master.SYNC_INT is selected as the SYNC input to clock distribution block 1161. On the other hand, when clock distribution block 1161 provides a slave synchronous output, SELA should be configured so Master.SYNC_SS is selected. In a similar manner, the control inputs to multiplexers 1145, 1150, and 1155 (SELB, SELC and SELD, respectively) select either Master.SYNC_SS or Master.SYNC_INT to drive the SYNC inputs of CLKDIST blocks 1164, 1171, and 1176, respectively, thereby allowing any output from the master to drive a slave chip or provide a slave synchronous clock output.

In the illustrated embodiment, although there are multiple multiplexers, one SLAVE SYNC DELAY circuit is used because the amount of delay required to be slave synchronous is the same for all slave synchronous outputs.

In addition to the multiplexers 1140, 1145, 1150, and 1155, circuit 1100 also adds a circuit, SLV_IN_DEL, to each CLKDIST block. Like the SLAVE SYNC DELAY block (1135), SLV_IN_DEL is a configurable CLKI cycle delay block. In some embodiments, the SLV_IN_DEL circuits are needed when multiple master output clocks at different frequencies drive multiple slave chips. For example, assume signal Master.CLKO_A (1180) from CLKDIST block 1161 is used to drive a first slave chip at the same frequency as CLKI, while Master.CLKO_B (1185) is used to drive a second identical slave chip at one-third the frequency of CLKI. Since both slave chips are identical, their values of K are also identical. Therefore, both slave chips require the same number of input clock cycles before they resume clocking. However, because the input clock frequency of the second slave chip is one-third the frequency of the first chip's clock input, the outputs of the second slave chip will resume transitioning later than the outputs of the first slave chip, if no changes are made. In order for both the first and second slave chips to be clock edge synchronous, the gated clock input to the first slave chip needs to be delayed K×2 CLKI cycles, which is accomplished with the SLV_IN_DEL block 1160. In general, SLV_I_DEL is determined based on the following formulae:

$$\text{SLAVE SYNC DELAY} = K \times \text{Max}(M_I)$$

$$\text{SLV\_IN\_DEL}_I = \text{SLAVE SYNC DELAY} - (K \times M_I), \text{ and}$$

where:
K is the number of input clock cycles of propagation delay for a specific slave chip (K=4 in FIG. 12)
$M_I$ is the divide modulus, with respect to CLKI, of a gated master clock output used to drive a specific slave chip, I ($M_A$=1 and $M_B$=3 for slave chips A and B shown in FIG. 12)
Max ($M_I$) represents the largest value of $M_I$ for all slaves driven by a single master (Max ($M_I$)=3 in FIG. 12)
SLAVE SYNC DELAY is the required number of CLKI cycles to obtain slave synchronous outputs of the master chip (SLAVE SYNC DELAY=4×3=12 CLKI cycles in FIG. 12)
SLV_IN_DEL$_I$ is the additional number of CLKI cycles delay required in the SLV_IN_DEL block for a master output clock used to drive a specific slave chip, I, to obtain clock edge synchronization of all slave chips (SLV_IN_DEL$_A$=12−(4×1)=8 CLKI cycles; SLV_IN_DEL$_B$=12−(4×3)=0 CLKI cycles shown in FIG. 12)

As illustrated in FIG. 11, the SLV_IN_DEL circuit 1160 provides delay to CLKDIST block 1161. Similarly, the SLV_IN_DEL circuits 1165, 1170 and 1175 provide delays for CLKDIST blocks 1164, 1171 and 1174, respectively.

Figure 12:
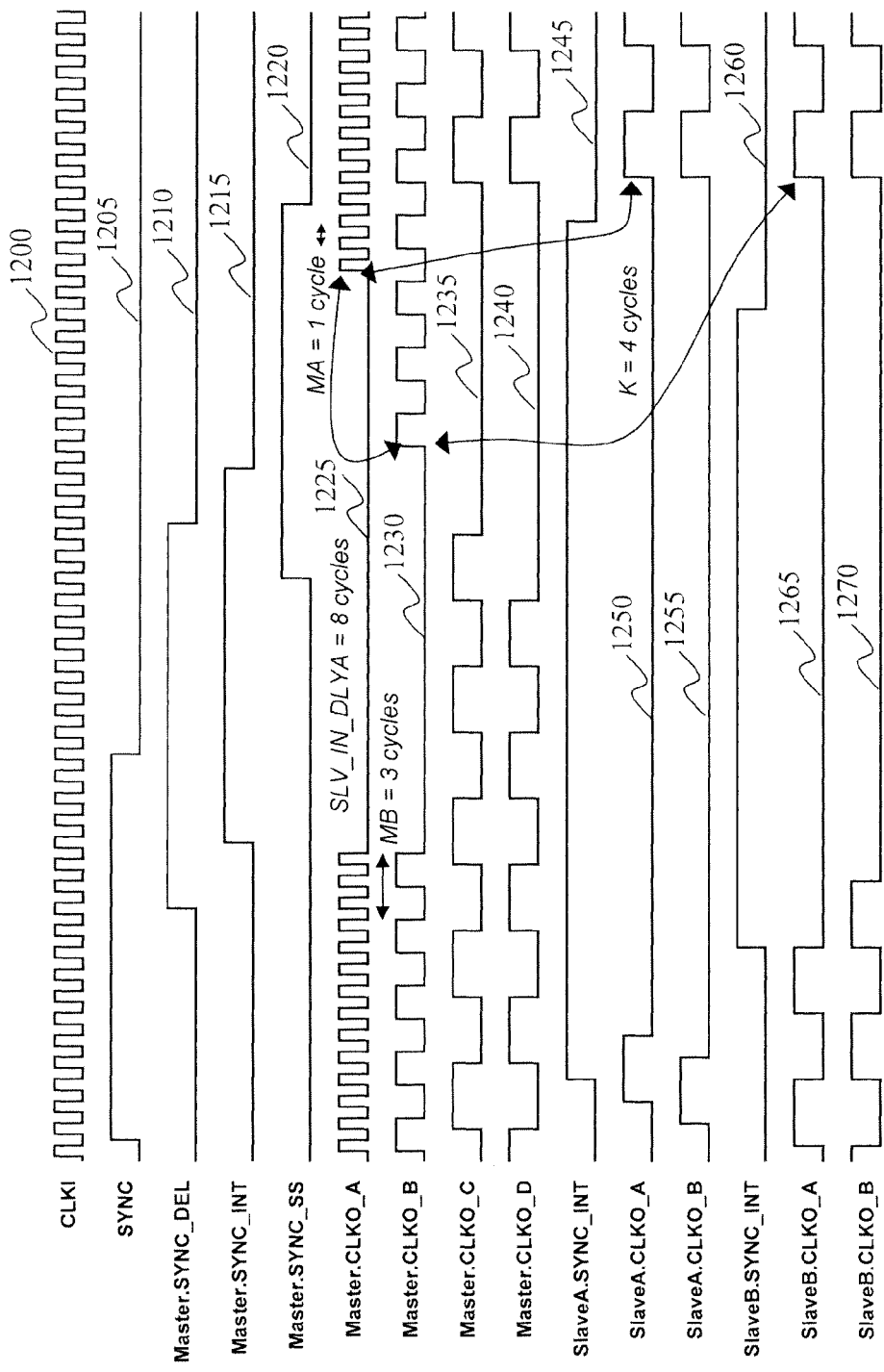
FIG. 12 shows timing diagrams of different signals produced by the circuit as depicted in FIG. 11.

The timing diagram shown in FIG. 12 illustrates the relationship among different signal phases. Master.CLKO_B (1230), the master chip output that drives slave chip B, begins transitioning at the first CLKI (1200) rising edge after signal Master.SYNC_INT (1215) goes low. Consequently, the outputs of the second slave chip (e.g., SlaveB.CLKO_A (1265) and SlaveB.CLKO_B (1270), as shown in FIG. 12) do not begin transitioning until K cycles of Master.CLKO_B (1230). This is 12 CLKI (1200) cycles after the first rising edge of Master.CLKO_B (1230). Therefore, the SLAVE SYNC DELAY block (1135) delays the Master.SYNC_SS (1220) signal by 12 CLKI (1200) cycles relative to Master.SYNC_INT (1215) so Master.CLKO_C (1235) and Master.CLKO_D (1240) are slave synchronous. Finally, for the outputs of the first slave chip (e.g. SlaveA.CLKO_A (1250) and SlaveA.CLKO_B (1255) in FIG. 12) to be clock edge synchronized with the other outputs, the master chip output driving the first slave chip, Master.CLKO_A (1225), should begin transitioning 8 CLKI (1200) cycles after the rising edge of Master.CLKO_B (1230). As can be seen in FIG. 12, these settings allow all slave synchronous outputs of the master chip to be clock edge synchronized with all outputs of both slave chips.

FIGS. 11 and 12 assume that the K values of both slave chips are identical. Although this is normally true, in certain situations the K values for different slave chips may not be equal. For the case where a master chip is to drive multiple slave chips with different values of K, the previous formulae can be modified as follows:

$$\text{SLAVE SYNC DELAY} = \text{Max}(K_I \times M_I), \text{ and}$$

$$\text{SLV\_IN\_DEL}_I = \text{SLAVE SYNC DELAY} - (K_I \times M_I)$$

where:
$K_I$ is the number of input clock cycles of propagation delay for a specific slave chip, I
Max ($K_I \times M_I$) represents the largest value of the product of $K_I$ and $M_I$ for all slaves driven by a single master
Other variables are as described above It is worth mentioning that even though the output clocks of the slave chips are clock edge synchronized with the slave synchronous outputs of the master chip, the slave's output clocks generally have some additional delay relative to the master chip's slave synchronous outputs. Such skew usually is a result of trace delays from the master chip's output to a slave chip's clock input, in addition to propagation delays within the slave chip. For applications where this skew is too large, it may be appropriate to use only the slave chips' output clocks. Even so, careful matching of the trace lengths from each master chip output to each respective slave chip input is required to minimize any skew between the different slave chips' outputs.

The previous calculations described herein assume that the value of SLAVE SYNC DELAY is adjustable to achieve a minimum additional delay of the Master.SYNC_SS signal. However, by assuming a maximum value for SLAVE SYNC DELAY, the design of this block can be simplified with a fixed CLKI cycle delay. In this case, the formulae described herein still apply, but the SLAVE SYNC DELAY value may not be minimized.

Although the disclosure provided so far is based on a rising edge system, the present teaching is not polarity or edge specific. That is, the present teaching can be equally effectively implemented based on alternatives in which outputs may hold high during a synchronization operation and then clock on falling edges. In addition, although a slave disclosed so far has two output clocks, the present teaching can also be applied to slave chips that have any number of output clocks. Similarly, the present teaching can be applied to a master chip that has any number of output clocks. Furthermore, the number of slave chips that a master chip can drive can be more than two, up to the number of output clocks from the master chip.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. An apparatus for clock edge synchronization among a plurality of devices, comprising:
    a master device configured for providing one or more gated master output clock signals based on a synchronization input signal and an input clock signal; and
    one or more slave devices configured for producing one or more slave output clock signals based on the synchronization input signal and corresponding one or more gated master output clock signals, wherein the one or more slave devices produce output clock signals that are clock edge synchronized.

2. The apparatus of claim 1, wherein the master device comprises:
    a synchronization signal delay circuit configured for receiving a synchronization input signal and delaying the synchronization input signal for a first defined period to produce a delayed synchronization signal;
    a first re-timing circuit configured for re-timing, with respect to a master clock input signal, the delayed synchronization signal to generate a first master internal synchronization signal; and
    one or more clock distribution circuits configured to each produce one or more gated master clock output signals based on the master clock input signal and the first master internal synchronization signal.

3. The apparatus of claim 2, wherein the re-timing circuit comprises a plurality of serially connected flip-flops.

4. The apparatus of claim 2, wherein the master device further comprises:
    a slave synchronization delay circuit configured for delaying the first master internal synchronization signal for a second defined period, thereby generating a second master internal synchronization signal;
    the one or more clock distribution circuits being further configured to produce corresponding one or more slave synchronized master output clock signals, at one or more different frequencies, that are clock edge synchronized with the one or more slave device output clock signals, based on the clock input signal and the second master internal synchronization signal.

5. The apparatus of claim 4, wherein the master device further comprises one or more selector circuits, each of which is associated with a corresponding clock distribution circuit, wherein each selector circuit
    takes the first and second master internal synchronization signals and a selection control signal as inputs;
    selects, based on the selection control signal, either the first or the second master internal synchronization signal to drive an input of an associated clock distribution circuit so that
    when the first master internal synchronization signal is selected, a corresponding clock distribution circuit generates a gated master output clock to drive a slave device, and
    when the second master internal synchronization signal is selected, a corresponding clock distribution circuit generates a gated master output clock that is clock edge synchronized with all slave output clock signals.

6. The apparatus of claim 4, wherein the second defined period, SLAVE SYNC DELAY, is set to a number of cycles of the input clock to the master device.

7. The apparatus of claim 6, wherein the number of cycles, SLAVE SYNC DELAY, is determined based on Max ($K_I \times M_I$), where
    $K_I$ is the number of input clock cycles of propagation delay for a specific slave device, I, and
    $M_I$ is a divide modulus, with respect to the input clock to the master device, of a clock distribution circuit of the master device which provides the gated master output clock signal to a specific slave device, I, and
    Max ($K_I \times M_I$) is the maximum value of the product of $K_I$ and $M_I$ for every slave device, I, with a gated clock input driven by the master device.

8. The apparatus of claim 7, wherein the second defined period, SLAVE SYNC DELAY, is determined based on a value obtained in a look-up operation from a table stored in the master device.

9. The apparatus of claim 2, wherein each of the one or more clock distribution circuits comprises:
    a slave input delay circuit configured to delay the first master internal synchronization signal for a third defined period, thereby generating a third master internal synchronization signal, from which a gated master output clock signal is generated as an input to a slave device so that slave output clock signals generated are clock edge synchronized.

10. The apparatus of claim 9, wherein the third defined period is determined based on SLAVE SYNC DELAY−($K_I \times M_I$), wherein
    SLAVE SYNC DELAY is set to a number of cycles of the input clock signal to the master device, and
    $K_I$ is the number of input clock cycles of propagation delay for a specific slave device, I, and
    $M_I$ is a divide modulus, with respect to the input clock signal to the master device, of a clock distribution circuit of the master device providing the gated master output clock signal to a slave device, I.

11. The apparatus of claim 10, wherein the third defined period is determined via a look-up operation performed with respect to a table stored on the master device.

12. The apparatus of claim 9, wherein the third defined period is determined based on SLAVE SYNC DELAY−($K_I \times M_I$), wherein
    SLAVE SYNC DELAY=Max ($K_I \times M_I$), where
    $K_I$ is the number of input clock cycles of propagation delay for a specific slave device, I,
    $M_I$ is a divide modulus, with respect to the input clock signal to the master device, of a clock distribution circuit of the master device providing the gated master output clock signal to a slave device, I, and
    Max ($K_I \times M_I$) is the maximum value of the product of $K_I$ and $M_I$ for every slave device, I, with a gated clock input driven by the master device.

13. The apparatus of claim 12, wherein the third defined period is determined via a look-up operation performed with respect to a table stored on the master device.

14. The apparatus of claim 2, wherein the first defined period corresponds to a value greater than a maximum expected delta delay between the propagation delay of the synchronization input signal to any slave device versus the propagation delay of the synchronization input signal to the master device.

15. The apparatus of claim 2, in which the one or more clock distribution circuits each drives one or more slave devices at one or more frequencies and are clock edge synchronized with all slave output clock signals.

16. The apparatus of claim 1, wherein each of the one or more slave devices comprises:
   a second re-timing circuit configured for, upon receiving a synchronization input signal and a gated master output clock signal, retiming the synchronization input signal with respect to the gated master clock output signal to produce a slave internal synchronization signal; and
   one or more clock distribution circuits configured to each produce one or more slave output clock signals based on the gated master clock output signal and the slave internal synchronization signal.

17. The apparatus of 16, in which the one or more clock distribution circuits each drives one or more slave devices at one or more frequencies and are clock edge synchronized with all slave output clock signals.

18. An apparatus for clock edge synchronization among a plurality of devices, comprising:
   a master device configured for providing at least one gated master output clock signal for driving one or more slave devices and one or more other gated master output clock signals based on a synchronization input signal and an input clock signal;
   one or more slave devices configured for producing one or more slave output clock signals based on the synchronization input signal and at least one gated master output clock signal, wherein
   the one or more slave output clock signals are clock edge synchronized, and
   the one or more other gated master output clock signals are clock edge synchronized with the slave output clock signals.

19. An apparatus for clock edge synchronization among a plurality of devices, comprising:
   a master device configured for providing one or more gated master output clock signals based on a synchronization input signal and an input clock signal;
   one or more slave devices configured for producing one or more slave output clock signals based on the synchronization input signal and at least one gated master output clock signal, wherein
   the master device comprises one or more clock distribution circuits, each of which generates a corresponding gated master output clock signal, and wherein
   each gated master output clock signal is configurable selectively for driving a slave device or for being a master output clock signal that is clock edge synchronized with the slave output clock signals.

20. The apparatus of claim 19, in which the one or more clock distribution circuits each drives one or more slave devices at one or more frequencies and are clock edge synchronized with all slave output clock signals.

21. A master device apparatus for clock edge synchronization among a plurality of devices, comprising:
   a master device configured for providing one or more gated master output clock signals based on a synchronization input signal and an input clock signal;
   wherein the master device comprises:
   a synchronization signal delay circuit configured for receiving a synchronization input signal and delaying the synchronization input signal for a first defined period to produce a delayed synchronization signal;
   a first re-timing circuit configured for re-timing, with respect to a master clock input signal, the delayed synchronization signal being provided to generate a first master internal synchronization signal; and
   one or more clock distribution circuits configured to each produce one or more gated master clock output signals based on the master clock input signal and the first master internal synchronization signal; and wherein
   the one or more clock distribution circuits each is configured to drive one or more slave devices, having slave output clock signals, at one or more frequencies and are clock edge synchronized with all slave output clock signals.

22. The apparatus of claim 21, wherein the re-timing circuit comprises a plurality of serially connected flip-flops.

23. The apparatus of claim 21, wherein each of the one or more slave devices comprises:
   a second re-timing circuit configured for, upon receiving a synchronization input signal and a gated master output clock signal, retiming the synchronization input signal with respect to the gated master clock output signal to produce a slave internal synchronization signal; and
   one or more clock distribution circuits configured to each produce one or more slave output clock signals based on the gated master clock output signal and the slave internal synchronization signal.

24. The apparatus of claim 21, wherein the master device further comprises:
   a slave synchronization delay circuit configured for delaying the first master internal synchronization signal for a second defined period, thereby generating a second master internal synchronization signal;
   the one or more clock distribution circuits being further configured to produce corresponding one or more slave synchronized master output clock signals, at one or more frequencies, that are clock edge synchronized with the one or more slave device output clock signals, based on the clock input signal and the second master internal synchronization signal.

25. The apparatus of claim 24, wherein the master device further comprises one or more selector circuits, each of which is associated with a corresponding clock distribution circuit, wherein each selector circuit
   takes the first and second master internal synchronization signals and a selection control signal as inputs;
   selects, based on the selection control signal, either the first or the second master internal synchronization signal to drive an input of an associated clock distribution circuit so that
   when the first master internal synchronization signal is selected, a corresponding clock distribution circuit generates a gated master output clock to drive a slave device, and
   when the second master internal synchronization signal is selected, a corresponding clock distribution circuit generates a gated master output clock that is clock edge synchronized with all slave output clock signals.

26. The apparatus of claim 21, wherein each of the one or more clock distribution circuits comprises:

a slave input delay circuit configured to delay the first master internal synchronization signal for a third defined period, thereby generating a third master internal synchronization signal, from which a gated master output clock signal is generated as an input to a slave device so that slave output clock signals generated are clock edge synchronized.

27. A master device apparatus for clock edge synchronization with one or more slave devices which are configured for producing one or more slave output clock signals based on a synchronization input signal and at least one gated master output clock signal, the master device apparatus being configured for providing one or more gated master output clock signals based on the synchronization input signal and an input clock signal, and comprising one or more clock distribution circuits, each of which generates a corresponding gated master output clock signal, and wherein each gated master output clock signal is configurable selectively for driving the one or more slave devices or being a master output clock signal that is clock edge synchronized with the slave output clock signals.

28. The apparatus of 27, in which the one or more clock distribution circuits each drives one or more slave devices at different frequencies and are clock edge synchronized with all slave output clock signals.

29. A master device apparatus for clock edge synchronization among a plurality of devices, comprising:

a master device configured for providing one or more gated master output clock signals based on a synchronization input signal and an input clock signal, and comprising one or more clock distribution circuits, each of which generates a corresponding gated master output clock signal at one or more frequencies, wherein each clock distribution circuit is configured to drive one or more slave devices, which are configured for producing one or more slave output clock signals, based on a synchronization input signal and at least one gated master output clock signal, and wherein the one or more output clock signals of the one or more slave devices are clock edge synchronized.

* * * * *

UNITED STATES PATENT AND TRADEMARK OFFICE
CERTIFICATE OF CORRECTION

PATENT NO. : 8,819,472 B1  
APPLICATION NO. : 13/024916  
DATED : August 26, 2014  
INVENTOR(S) : Leslie Catherine Muscha Page 1 of 1

It is certified that error appears in the above-identified patent and that said Letters Patent is hereby corrected as shown below:

In the Specification

Column 9, line number 40, should read:

*SLV_IN_DEL is determined based on the following formulae:*

Signed and Sealed this
Sixth Day of January, 2015

Michelle K. Lee
*Deputy Director of the United States Patent and Trademark Office*